(12) United States Patent
Zheng et al.

(10) Patent No.: US 11,768,309 B2
(45) Date of Patent: Sep. 26, 2023

(54) MAGNETISM DETECTION APPARATUS FOR UNDERWATER UNEXPLODED ORDNANCE AND METHOD FOR CONTROLLING THE SAME

(71) Applicants: Tsinghua University, Beijing (CN); BEIJING INSTITUTE OF SATELLITE ENVIRONMENTAL ENGINEERING, Beijing (CN)

(72) Inventors: Xiao-Ping Zheng, Beijing (CN); Zhen-Yuan Sun, Beijing (CN); Hua Geng, Beijing (CN); Xiao-Jiao Deng, Beijing (CN); Bin Wang, Beijing (CN); Guo-Min Zuo, Beijing (CN)

(73) Assignees: TSINGHUA UNIVERSITY, Beijing (CN); BEIJING INSTITUTE OF SATELLITE ENVIRONMENTAL ENGINEERING, Beijing (CN)

( * ) Notice: Subject to any disclaimer, the term of this patent is extended or adjusted under 35 U.S.C. 154(b) by 438 days.

(21) Appl. No.: 16/845,037

(22) Filed: Apr. 9, 2020

(65) Prior Publication Data
US 2020/0326444 A1    Oct. 15, 2020

(30) Foreign Application Priority Data

Apr. 12, 2019 (CN) .......................... 201910295335.3

(51) Int. Cl.
*G01V 3/08* (2006.01)
*G01V 3/165* (2006.01)

(52) U.S. Cl.
CPC .............. *G01V 3/081* (2013.01); *G01V 3/165* (2013.01)

(58) Field of Classification Search
CPC . G01V 3/081; G01V 3/15; G01V 3/16; G01V 3/165; F41H 11/12; F41H 11/13;
(Continued)

(56) References Cited

U.S. PATENT DOCUMENTS 5,777,477 A * 7/1998 Wynn ..................... G01V 3/165
324/345
6,809,520 B1 * 10/2004 Nelson ..................... G01V 3/15
89/1.13
(Continued)

FOREIGN PATENT DOCUMENTS

| CN | 102124377 | 7/2011 |
|---|---|---|
| CN | 103645515 | 3/2014 |

(Continued)

*Primary Examiner* — David M Schindler

(57) ABSTRACT

A magnetism detection apparatus includes a detection device, at least one first locating device, and a central control device. The detection device includes an array of detection assemblies arranged in a same plane. The array of detection assemblies is configured to detect magnetic fields and output magnetic field signals corresponding to locations of the detection assemblies. The at least one first locating device is disposed on one of the detection assemblies to locate this detection assembly and output a first coordinate signal corresponding to this detection assembly. The central control device is communicatively and respectively connected to each of the detection assemblies and the at least one first locating device, and configured to process the magnetic field signals and the first coordinate signal.

18 Claims, 4 Drawing Sheets

(58) Field of Classification Search
CPC .......... F41H 11/136; B63G 7/00; B63G 7/06; B63G 7/065
See application file for complete search history.

(56) References Cited

U.S. PATENT DOCUMENTS

| | | | |
|---|---|---|---|
| 7,688,072 B1* | 3/2010 | Wiegert | G01V 3/15 |
| | | | 324/225 |
| 2010/0102809 A1* | 4/2010 | May | G01R 33/022 |
| | | | 324/244 |
| 2018/0329104 A1 | 11/2018 | Tshering et al. | |
| 2021/0124085 A1* | 4/2021 | Chabert | G01S 15/88 |

FOREIGN PATENT DOCUMENTS

| | | | | |
|---|---|---|---|---|
| CN | 105911487 | | 8/2016 | |
| CN | 106990440 A | | 7/2017 | |
| CN | 108279438 | | 7/2018 | |
| CN | 109001819 | | 12/2018 | |
| CN | 110231656 A | * | 9/2019 | .............. G01V 3/08 |

\* cited by examiner

MAGNETISM DETECTION APPARATUS FOR UNDERWATER UNEXPLODED ORDNANCE AND METHOD FOR CONTROLLING THE SAME

CROSS-REFERENCE TO RELATED APPLICATIONS

This application claims all benefits accruing under 35 U.S.C. § 119 from China Patent Application No. 201910295335.3 filed on Apr. 12, 2019, in the China National Intellectual Property Administration, the contents of which are incorporated by reference herein.

FIELD

The present disclosure relates to the field of detection, in particular to a magnetism detection apparatus for underwater unexploded ordnances and a method for controlling the same.

BACKGROUND

A magnetism detection method is currently one of the most economical and effective methods for detecting an underwater or underground metal object with a relatively large volume. The principle of the magnetism detection method is to measure strengths or gradients of magnetic fields at different locations near the object by using a magnetic field measuring instrument, and analyze all of the measured strengths or gradients to determine the location where the object may be present. However, in order to measure the strengths or the gradients in a water area, the magnetic field measuring instrument has to be carried by a tugboat or brought into water with a diver, which has a very low efficiency.

SUMMARY

According to an aspect of the present disclosure, a magnetism detection apparatus for an underwater unexploded ordnance is provided.

The magnetism detection apparatus includes a detection device, at least one first locating device, and a central control device. The detection device includes an array of detection assemblies arranged in a same plane. The array of detection assemblies is configured to detect magnetic fields and output magnetic field signals corresponding to locations of the detection assemblies. The at least one first locating device is disposed on one of the detection assemblies to locate this detection assembly and output a first coordinate signal corresponding to this detection assembly. The central control device is communicatively and respectively connected to each of the detection assemblies and the at least one first locating device. The central control device is configured to store information of relative locations of the detection assemblies, receive the magnetic field signals and the first coordinate signal, and obtain the location of the detection assembly sending a maximum magnetic field signal based on the first coordinate signal and the information of the relative locations of the detection assemblies.

According to another aspect of the present disclosure, a method for controlling the magnetism detection apparatus is provided, including:

controlling the detection assemblies to detect the magnetic fields and output the magnetic field signals corresponding to the locations of the detection assemblies;

controlling the first locating device to locate the one of the detection assemblies and output the first coordinate signal;

controlling the central control device to receive the magnetic field signals and the first coordinate signal, and obtain the location of the detection assembly sending the maximum magnetic field signal based on the first coordinate signal and the information of the relative locations of the detection assemblies.

The detection apparatus of the present disclosure can simultaneously detect magnetic fields at different locations through the plurality of detection assemblies and simultaneously process detected magnetic field signals through the central control device, thereby improving the working efficiency.

DETAILED DESCRIPTION

Figure 1:
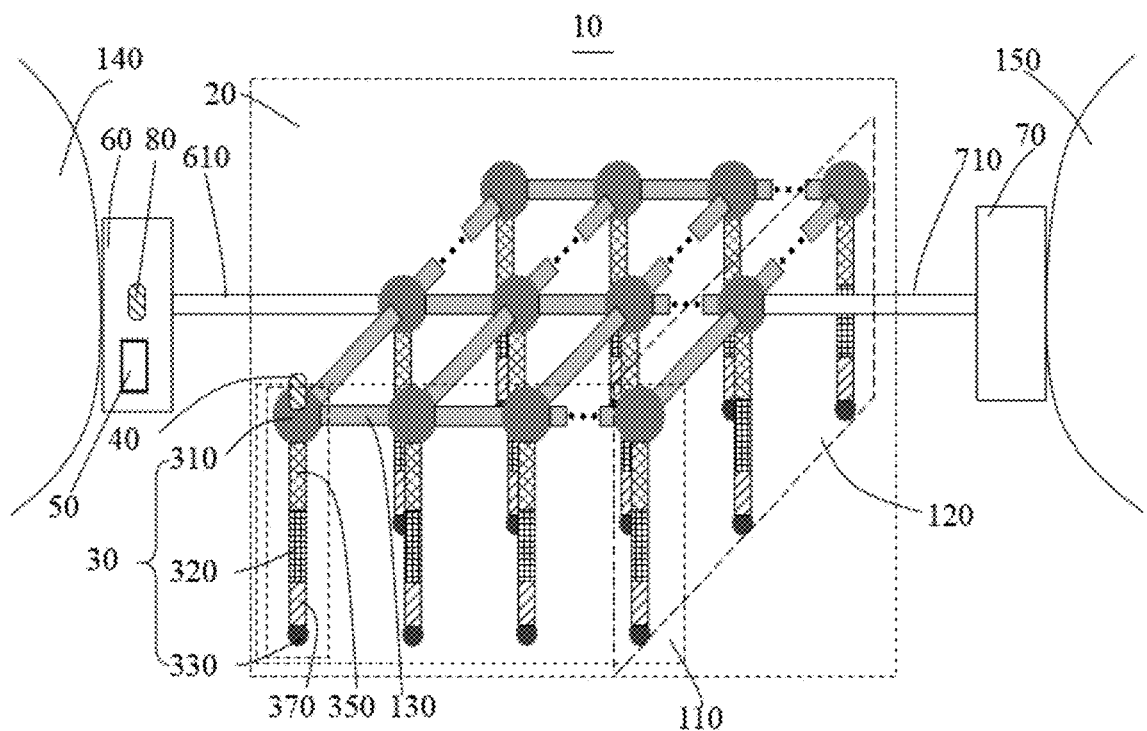
FIG. 1 is a schematic structural view of a magnetism detection apparatus according to an embodiment of the present disclosure.

For a clear understanding of the technical features, objects and effects of the present disclosure, specific embodiments of the present disclosure will now be described in detail with reference to the accompanying drawings. It is to be understood that the following description is merely exemplary embodiment of the present disclosure, and is not intended to limit the scope of the present disclosure.

It will be understood that when an element is referred to as being "connected" or "coupled" to another element, it can be directly connected or coupled to the other element, or indirectly connected or coupled to the other element through intervening elements. It should be also noted that the terms such as "first" and "second" are only used herein to distinguish an entity or operation from another entity or operation, and not necessarily require or imply any actual relationship or order between those entities and operations. Moreover, the terms such as "central," "upper," "lower," "front," "rear," "left," "right," "vertical," "horizontal," "top," "bottom," "inner," "outer," should be construed to refer to the orientation as then described or as shown in the drawings under discussion. These relative terms are for convenience of description and do not require that the present disclosure be constructed or operated in a particular orientation.

Referring to FIG. 1, a magnetism detection apparatus 10 for an unexploded ordnance which is located in a water area, such as an underwater unexploded ordnance, is provided according to an embodiment of the present disclosure. The magnetism detection apparatus 10 includes a detection device 20, at least one first locating device 40, and a central control device 50. The detection device 20 can include an array of detection assemblies 30. The array of detection assemblies 30 can be arranged in a same plane; for example, the detection assemblies 30 are arranged at the same horizontal level. The detection assemblies 30 can independently detect magnetic fields and output respective magnetic field signals. The detection assemblies 30 are located at different locations, so the magnetic field signals reflect the strengths or gradients of the magnetic fields corresponding to the locations of the detection assemblies 30. Each of the at least one first locating device 40 can be disposed on one of the detection assemblies 30 to locate this detection assembly 30 and output a first coordinate signal corresponding to this detection assembly 30.

The central control device 50 includes a memory to store information of relative locations of the detection assemblies 30. The information of the relative locations can be previously inputted into the central control device 50. The central control device 50 can be communicatively and respectively connected to the detection assemblies 30 and the at least one first locating device 40. The central control device 50 can receive the magnetic field signals and the first coordinate signal, and obtain the location of the detection assembly 30 that outputs a maximum magnetic field signal based on the first coordinate signal and the information of the relative locations of the detection assemblies 30. The location of the detection assembly 30 that outputs the maximum magnetic field signal can be or close to the location of a magnetic object, such as the unexploded ordnance. In an embodiment, the central control device 50 compares the magnetic field signals with each other, and finds the magnetic field signal with the maximum value as the maximum magnetic field signal.

The central control device 50 can be a computer system which includes a central processor, the memory, an input device, and an output device. The memory also stores computer-executable instructions. The central processor executes the instructions to control the detection and process data.

The detection apparatus 10 of the present disclosure can simultaneously detect magnetic fields at different locations through the detection assemblies 30 and simultaneously process the detected magnetic field signals through the central control device 50, thereby improving the working efficiency.

Moreover, the whole structure of the detection device 20 is stable since the detection assemblies 30 are arranged in the same plane, so that a resistance of the detection device 20 against water flow impact is improved and the detection accuracy is increased.

The detection assembly 30 can include a magnetic field detector 320, such as a magnetometer or a magnetic field gradiometer to detect strength or gradient of magnetic field. The array of the detection assembly 30 can simultaneously detect strengths or gradients of magnetic fields at different locations. The array can be a regular-shaped array, such as a radial array, a circular array, a rectangular array, and so on, or be an irregular-shaped array. Any one of the detection assemblies 30 can be fixedly connected to at least one of other detection assemblies 30. The fixed connection can be a rigid connection to maintain a fixed distance between adjacent detection assemblies 30. The fixed connection between detection assemblies 30 can be achieved, for example by, a connecting rod 130. In an embodiment, the detection device 20 includes a plurality of connecting rods 130, each of which is fixed between two adjacent detection assemblies 30 to space the two adjacent detection assemblies 30 from each other.

The central control device 50 can be communicatively connected to each of the detection assemblies 30 through cables or wireless communication, thereby receiving the magnetic field signals sent from the detection assemblies 30.

In an embodiment, the central control device 50 is communicatively connected to each of the detection assemblies 30 through cables, thereby ensuring a reliable and smooth communication in water. In another embodiment, the central control device 50 is communicated with each of the detection assemblies 30 through wireless communication, such as WIFI, Bluetooth®, local area network, and so on, which is convenient, fast, and resource-saved.

The information of the relative locations represents the locations of the detection assemblies 30 relative to each other. The detection assemblies 30 can be numbered previously. The information of the relative location of each of the detection assemblies 30 can be also determined and stored previously. In an embodiment, after the detection assemblies 30 are deployed and the locations of the detection assemblies 30 relative to each other are fixed, the information of the relative locations of the detection assemblies 30 are determined and stored. The serial number of each of the detection assemblies 30 can be corresponding to its relative location information. Thereby, once an absolute location of one detection assembly 30 is known, the absolute locations of all of the detection assemblies 30 can be determined.

In an embodiment, the detection apparatus 10 includes only one first locating device 40 to detect the location, e.g., the absolute location, of the detection assembly 30 having the first locating device 40 mounted thereon. The first locating device 40 outputs the first coordinate signal indicating the location of the detection assembly 30 having the first locating device 40 mounted thereon. A location of any one of the detection assemblies 30 can be determined according to the first coordinate signal and the information of the relative locations of the plurality of detection assemblies 30.

In an embodiment, the detection device 20 can include rows 110 and columns 120 of detection assemblies 30. The rows 110 and the columns 120 are intersected with each other to form a matrix with a plurality of intersections. Each of the intersections is provided with one detection assembly 30. Any two adjacent detection assemblies 30 in any same row 110 are fixedly connected by a fixing rod 130, and any two adjacent detection assemblies in any same column 120 can be connected by another fixing rod 130. The fixing rods 130 can have the same length to maintain a uniform distribution of the detection assemblies 30. The detection device 20 can be easily and quickly assembled, thereby increasing the working efficiency. When the detection apparatus 10 is used underwater, the detection assemblies 30 can be located substantially at a same depth, thereby increasing the stability of the whole structure of the detection device 20, the resistance against the water flow impact, and the detection accuracy.

In an embodiment, the detection apparatus 10 can further include a first fixing member 60, a second fixing member 70, and a second locating device 80. The first fixing member 60 can be rigidly connected to the detection device 20 and have a location of the detection device 20 fixed. For example, the first fixing member 60 can fix the detection device 20 to a first base 140, such as a rock, a boat, the river bed, the sea floor, a building, etc. The central control device 50 can be disposed on the first fixing member 60. The first fixing member 60 and the second fixing member 70 can be disposed at two opposite sides of, e.g., symmetrically with respect to, the detection device 20. The second fixing member 70 can be rigidly connected to the detection device 20 and have the location of the detection device 20 fixed in combination with the first fixing member 60. For example, the second fixing member 70 can fix the detection device 20 to a second base 150, such as a rock, a boat, the riverbed, the sea floor, a building, etc. By disposing the first fixing member 60 and the second fixing member 70 symmetrically with respect to the detection device 20, the fixation of the detection device 20 can be further enhanced and the resistance of the detection device 20 against the wave/wind can be further increased.

The second locating device 80 can be disposed on the first fixing member 60 to locate the first fixing member 60 and output a second coordinate signal corresponding to the location of the first fixing member 60. The second locating device 80 can be communicatively connected to the first locating device 40, e.g., through cables or wireless communication, thereby sending the second coordinate signal to the first locating device 40. The first locating device 40 can receive the second coordinate signal, correct the first coordinate signal according to the second coordinate signal, and send a corrected first coordinate signal to the central control device 50.

The second locating device 80 mounted on the first fixing member 60 can be less affected by the surroundings that that disposed on the detection assembly 30, and thus have a high reliability. The first locating device 40 can correct the first coordinate signal according to the second coordinate signal, e.g., based on real time kinematic (RTK) technology, to increase the accuracy of the first coordinate signal.

In an embodiment, at least one of the first locating device 40 and the second location device 80 is a satellite navigation receiver positioning by a global navigation satellite system (GNSS), such as GPS, GLONASS, Galileo, NavIC, or BeiDou.

The detection device 20 can include N rows 110 of detection assemblies 30 and M columns 120 of detection assemblies 30. In an embodiment, N is an odd number. The first fixing member 60 can be fixed to the first one of the detection assemblies 30 in (N+1)/2-th row 110 via a first connecting rod 610 perpendicular to the columns 120. The second fixing member 70 can be fixed to the last one of the detection assemblies 30 in (N+1)/2-th row 110 via a second connecting rod 610 perpendicular to the columns 120.

In another embodiment, N is an even number. The first fixing member 60 can be fixed to the first one of the detection assemblies 30 in (N+2)/2-th row 110 via the first connecting rod 610 perpendicular to the columns 120. The second fixing member 70 can be fixed to the last one of the detection assemblies 30 in (N+2)/2-th rows 110 via the second connecting rod 610 perpendicular to the columns 120.

The first connecting rod 610 and the second connecting rod 620 can be length-adjustable, so that the distance between the first fixing member 60 and the detection device 20, and the distance between the second fixing member 70 and the detection device 20 can be regulated.

In an embodiment, each of the detection assemblies 30 can include a head member 310, a magnetic field detector 320, a plummet (or plumb bob) 330, and a control device 340. The head member 310 can define a first hollow space 311 therein. The head member 310 can float in water. The head member 310, the magnetic field detector 320, and the plummet 330 are coaxially arranged in a first central axis 312. The first central axis 312 can be substantially perpendicular to the plane of the array of the detection assemblies 30.

Since the head member 310 can be above the water surface, a stable communication can be ensured.

In an embodiment, the head member 310 can define threaded holes at its top surface, bottom surface, front surface, rear surface, right surface, and/or left surface. An electrical interface with water-tightness can be provided on the head member 310. Each detection assembly 30 can be provided with one head member 310. The head members 310 of adjacent two detection assemblies 30 can be connected via the fixing rod 130 so as to achieve the fixed connection between the detection assemblies 30. The fixing rod 130 can has two opposite threaded ends which can be screwed into the threaded holes.

Due to the first hollow space 311 defined inside the head member 310, the head member 310 is lightweight and thus can float in water. In addition, the first hollow space 311 can be used as a storage space to receive an electric component. A communication line of the electric component can pass through the electrical interface.

The magnetic field detector 320, such as the magnetometer or the magnetic field gradiometer, can include a housing 321 connected to the head member 310. The magnetic field gradiometer can further include a first magnetometer 322 to detect a first magnetic field signal and a second magnetometer 323 to detect a second magnetic field signal. The first magnetometer 322 and the second magnetometer 323 can be disposed in the housing 321. The first magnetic field signal and the second magnetic field signal can be both strength signals of the magnetic fields.

The first magnetometer 322 and the second magnetometer 323 can be spaced from each other and disposed at different locations along the first central axis 312. The first central axis 312 can be arranged vertically in use, and the first magnetometer 322 and the second magnetometer 323 can be located at different heights, so that a gradient in the vertical direction between a first magnetic field signal detected by the first magnetometer 322 and a second magnetic field signal detected by the second magnetometer 323 can be obtained and utilized to increase the detection sensitivity so as to detect a small magnetic object.

The plummet 330 can be connected to an end of the housing 321 away from the head member 310. The plummet 330 can keep the housing 321 orienting vertically (i.e., in a direction of gravity) during the detection, thereby reducing the influence of wind/wave and increasing the detection accuracy. In an embodiment, the plummet 330 is a lead block connected to the housing 321.

The control device 340 can be received in the first hollow space 311, electrically connected to the magnetic field detector 320, and can include a power source to supply power to the magnetic field detector 320. In an embodiment, the control device 340 can receive the first magnetic field signal and the second magnetic signal sent from the first magnetometer 322 and the second magnetometer 323, and obtain the magnetic field gradient signal according to the first magnetic field signal and the second magnetic signal. The control device 340 can be communicatively connected to the central control device 50 and send the magnetic field gradient signal to the central control device 50.

Figure 2:
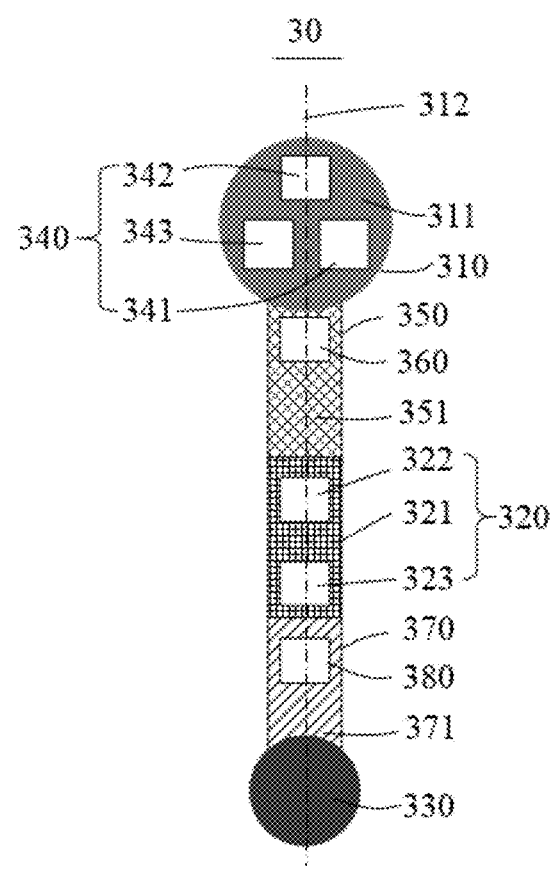
FIG. 2 is a schematic structural view of a detection assembly of the magnetism detection apparatus according to an embodiment of the present disclosure.
Figure 3:
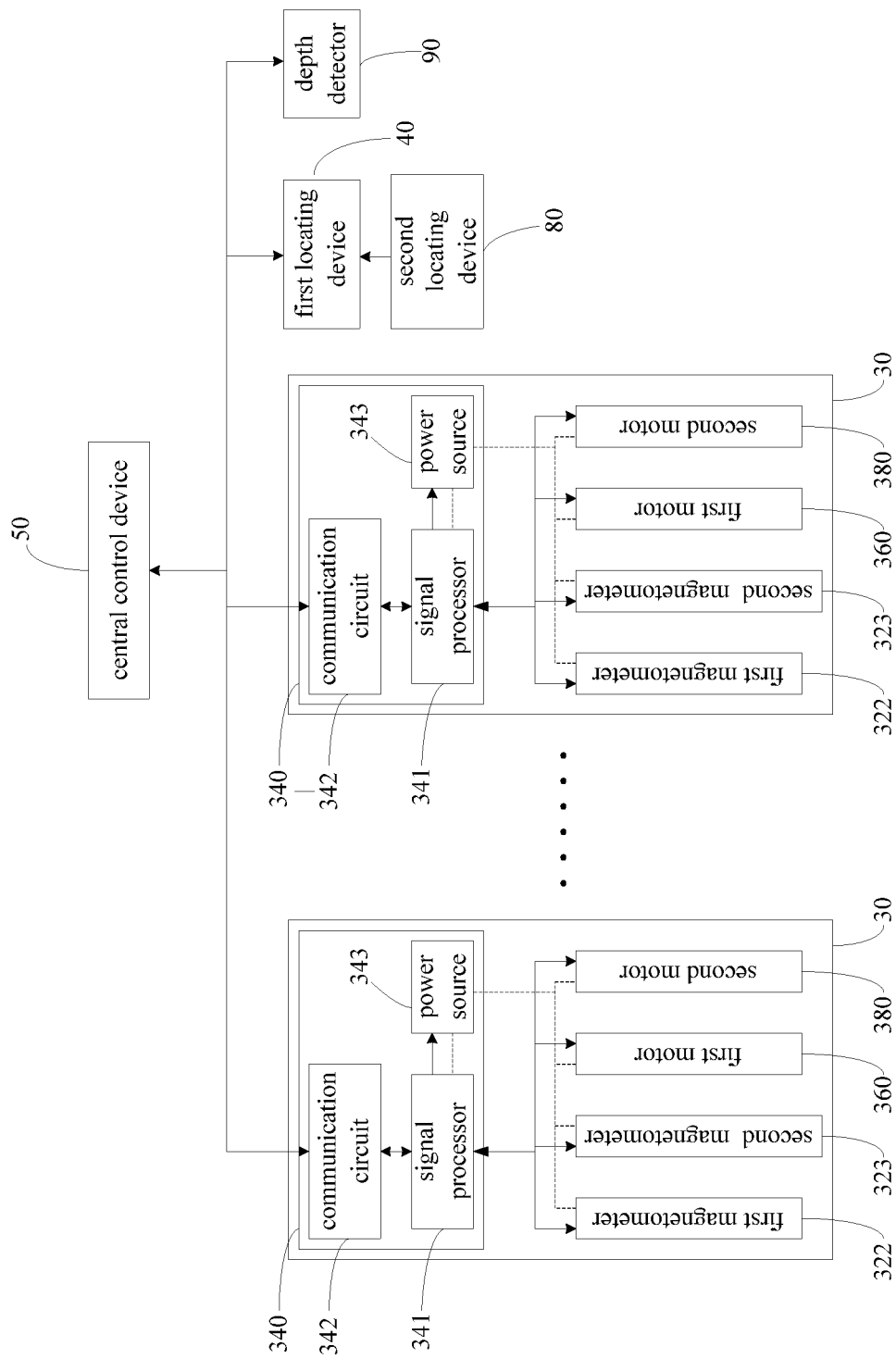
FIG. 3 is a block view showing an electrical connection relationship of components of the magnetism detection apparatus according to an embodiment of the present disclosure.

Referring to FIGS. 2 and 3, in an embodiment, the control device 340 includes a signal processor 341, a communication circuit 342, and a power source 343, received in the first hollow space 311. The signal processor 341 can be electrically and respectively connected to the first magnetometer 322 and the second magnetometer 323, and configured to receive and process the first magnetic field signal and the second magnetic field signal, and generate the magnetic field gradient signal. The communication circuit 342 can be communicatively and respectively connected to the signal processor 341 and the central control device 50, and configured to send the magnetic field gradient signal to the central control device 50. The power source 343 can be electrically and respectively connected to the first magnetometer 322, the second magnetometer 323, the signal processor 341, and the communication circuit 342.

The signal processor 341 can be an embedded microcomputer system which includes a controller, a memory, and a data collector. The signal processor 341 can be used for collecting data, processing data, transferring data, and controlling the generation of a signal.

In an embodiment, the communication circuit 342 can be a WIFI module, Bluetooth® module, or local area network module. The power source 343 can be a non-rechargeable battery or a rechargeable battery.

In an embodiment, the detection assembly 30 can further include a first stretchable rod 350 and a first motor 360. One end of the first stretchable rod 350 can be connected to the head member 310, and the other end of the first stretchable rod 350 can be connected to the housing 321. A second hollow space 351 can be defined in the end of the first stretchable rod 350 adjacent to the head member 330. The first stretchable rod 350 can stretch out or draw back along the length direction which is in the first central axis 312.

The first motor 360 can be received in the second hollow space 351. The first motor 360 can be electrically connected to the control device 340. The control device 340 can control on and off of the first motor 360 thereby driving the first motor 360 to rotate corresponding to an instruction received from the central control device 50. An output end of the first motor 360 can be connected to the first stretchable rod 350 to drive the first stretchable rod 350 to stretch out or draw back relative to the head member 330. The power source 343 can be electrically connected to the first motor 360 to supply power to the first motor 360.

The first motor 360 can drive the first stretchable rod 350 to stretch out or draw back vertically. When the detection apparatus 10 is used to detect a magnetic object, such as an unexploded ordnance, the first stretchable rod 350 can drive the plummet 330 to insert into the river bed or the sea floor to reduce the influence of wave and increase the detection accuracy. Further, the magnetic field detector 320 can be submerged deeper to detect the magnetic object at a deeper area.

In an embodiment, the detection assembly 30 can further include a second stretchable rod 370 and a second motor 380. One end of the second stretchable rod 370 can be connected to the housing 321, and the other end of the second stretchable rod 370 can be connected to the plummet 330. A third hollow space 371 can be defined in the end of the stretchable rod 370 adjacent to the housing 321. The second stretchable rod 370 can stretch out or draw back along the length direction which is in the first central axis 312.

The second motor 380 can be received in the third hollow space 371. The second motor 380 can be electrically connected to the control device 340. The control device 340 can control on and off of the second motor 380 thereby driving the second motor 380 to rotate corresponding to an instruction received from the central control device 50. An output end of the second motor 380 can be connected to the second stretchable rod 370 to drive the second stretchable rod 370 to stretch out or draw back relative to the housing 321. The power source 343 can be electrically connected to the second motor 380 to supply power to the second motor 380.

The second motor 380 can drive the second stretchable rod 370 to stretch out and draw back vertically. When the detection apparatus 10 is used to detect a magnetic object, such as an unexploded ordnance, in shallow water, the first stretchable rod 350 can firstly stretch out to a maximum extent, and then the second stretchable rod 370 can drive the plummet 330 to insert into the river bed or the sea floor. Stretching not only the first stretchable rod 350 but also the second stretchable rod 370 can be suitable for a deeper water area.

The detection apparatus 10 can further include a depth detector 90, such as a sonar detector. The depth detector 90 can be communicatively connected to the central control device 50. The depth detector 90 can be configured to detect a depth of the water (i.e., a distance from the water surface to the bottom) and output a water depth signal to the central control device 50. The sonar detector can be located in the head member 310. The central control device can receive the water depth signal and send a first stretching-out instruction indicating a first stretching-out length of the first stretchable rod 351 to the control device 340 according to the water depth signal. The central control device 50 can further send a second stretching-out instruction indicating a second stretching-out length of the second stretchable rod 371 to the control device 40 according to the water depth signal. The control device 340 receives the first stretching-out instruction and/or the second stretching-out instruction, and drive the first motor 360 and/or the second motor 380 to rotate so as to stretch out the first stretchable rod 351 and/or the second stretchable rod 371 to the predetermined lengths.

The detection apparatus 10 can be assembled before the detection. A method for assembling the detection apparatus 10 in an embodiment can include:

S021, fixing the first fixing member 60 and the second fixing member 70 to a first base 140 and a second base 150, respectively; mounting the central control device 50, and optionally, the second locating device 80 on the first fixing member 60;

S022, mounting the first locating device 40 on one detection assembly 30, and assembling the detection device 20 by fixing the array of detection assemblies 30 to each other via the plurality of fixing rods 130;

S023, fixing the first fixing member 60 to the detection device 20 via the first connecting rod 610, and fixing the second fixing member 70 to the detection device 20 via the second connecting rod 710; and S024, connecting the central control device 50 to the plurality of detection assemblies 30 electrically and respectively.

In the S021, the central control device 50, and optionally, the second locating device 80 can be fixed on the first fixing member 60 before or after fixing the first fixing member 60. The first base 140 and/or the second base 150 can be determined according to a specific water area to be detected in practice. For example, if a water area of a narrow river is to be detected, then the first fixing member 60 and the second fixing member 70 can be fixed at two opposite banks of the river or the buildings located on the banks. If a relative wide water area is to be detected, then the first fixing member 60 and the second fixing member 70 can be fixed to two boats.

In the S022, each of the detection assemblies 30 can be assembled previously before assembling of the detection device 20. The first locating device 40 can be mounted on the top surface of the head member 310 of one of the detection assemblies 30 through screw threaded connection. In an embodiment, the first stretchable rod 350 can have a threaded end away from the housing 321. The S022 can specifically include:

S0221, screwing the threaded end of the first stretchable rod 350 into the threaded hole at the bottom surface of the head member 310;

S0222, connecting the control device 340 to the first magnetometer 322, the second magnetometer 323, the first motor 360, and the second motor 370 electrically and respectively; and S0223, fixing the detection assemblies 30 to each other by screwing the threaded ends of the fixing rods 130 into respective threaded holes at the front, rear, right, and left surfaces of the head members 310.

In an embodiment, the first connecting rod 610 and the second connecting rod 710 each can have a threaded end. The S023 can include:

S0231, fixing an end of the first connecting rod 610 and an end the second connecting rod 710 to the first fixing member 60 and the second fixing member 70, respectively; and S0232, fixing the threaded end of the first connecting rod 610 and the threaded end of the second connecting rod 710 to the threaded holes of two detection assemblies 30 located at edges of the array of the detection assemblies 30, respectively.

In an embodiment, the first connecting rod 610 and the second connecting rod 710 can be length-adjustable. After the S0231, the lengths of the first connecting rod 610 and the second connecting rod 710 can be adjusted to reach the detection assemblies 30 at the edges of the array.

The numbers of the detection assemblies 30 and of the columns 120 and the rows 110 can be determined according to the size of the water area to be detected. In an embodiment, the lengths $L_8$ of the first connecting rod 610 and the second connecting rod 710 can be calculated according to the following equation:

$$L_8=[L_S-(M-1)\times L_7-M\times D_1]/2,$$

wherein $L_S$ is a distance between the first fixing member 60 and the second fixing member 70, $L_7$ is a length of the fixing rod 130, and $D_1$ is a diameter of the head member 310.

Figure 4:
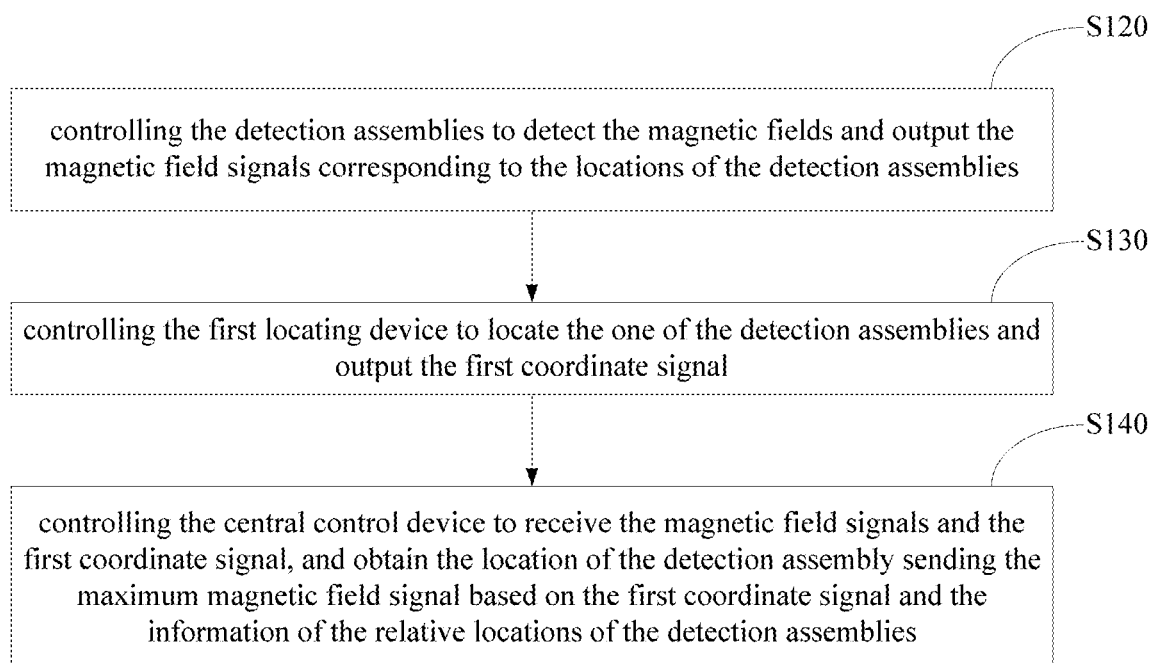
FIG. 4 is a flow chart of a method for controlling the magnetism detection apparatus according to an embodiment of the present disclosure.

Referring to FIG. 4, an embodiment of a method for controlling the detection apparatus 10 is further provided. The method includes:

S120, controlling the detection assemblies 30 to detect magnetic fields and output magnetic field signals corresponding to locations of the detection assemblies;

S130, controlling the first locating device 40 to locate one detection assembly 30 and output a first coordinate signal corresponding to this detection assembly 30;

S140, controlling the central control device 50, which stores the information of relative locations of the detection assemblies 30, to receive the magnetic field signals and the first coordinate signal, and obtain the location of the detection assembly 30 sending a maximum magnetic field signal based on the first coordinate signal and the information of the relative locations of the detection assemblies 30.

In an embodiment, the S130 can further include controlling the second locating device 80 to generate a second coordinate signal thereof, and send the second coordinate signal to the first locating device 40.

In an embodiment, the S130 can further include controlling the first locating device 40 to receive the second coordinate signal and correct the first coordinate signal according to the second coordinate signal to generate a corrected first coordinate signal.

In an embodiment, before the S120, the method can further include:

S100, controlling the detection apparatus 10 to perform a self-inspection.

In the S100, the central control device 50 can send a self-inspection signal to each of the detection assemblies 30, receive a feedback signal from each of the detection assemblies 30, and judge whether each of the detection assemblies 30 can work normally according to the feedback signal. If each of the detection assemblies 30 can work normally, then the S120 can be executed. If one or more of the detection assemblies 30 cannot work normally, then perform a repair procedure until all of the detection assemblies 30 can work normally before executing the S120.

In an embodiment, before the S120, the method can further include:

S111, controlling the depth detector 90 to detect a water depth of a targeted water area from the surface of the water to the bottom of the water; and S112, controlling the magnetic field detector 320 to reach a detection location according to the water depth.

In an embodiment, the S112 can specifically include:

S1121, controlling the central control device 50 to receive the water depth signal from the depth detector 90 and send a first stretching-out instruction indicating a first stretching-out length of the first stretchable rod 350 to the signal processor 341 according the water depth; and S1222, controlling the signal processor 341 to drive the first motor 360 according to the first stretching-out instruction so as to drive the first stretchable rod 350 to stretch out in the first stretching-out length thereby the magnetic field detector 320 reaching the detection location.

The first stretching-out length can be determined according to the following equation.

$$L_{s1} \leq D - L_{35} - L_{32} L_{37}$$

Wherein $L_{s1}$ is the first stretching-out length, D is the water depth, $L_{35}$ is a length of the first stretchable rod 350 before stretching out, $L_{32}$ is a length of the magnetic field detector 320, $L_{37}$ is a length of the second stretchable rod 370 before stretching out, and $L_{33}$ is a length of the plummet 330.

The central control device 50 can further send a first termination instruction to the signal processor 341 to terminate the stretching out of the first stretchable rod 350 once the magnetic field detector 320 reaches the detection location.

In an embodiment, the S112 can further include:

S1123, controlling the central control device 50 to send a second stretching-out instruction indicating a second stretching-out length of the second stretchable rod 370 to the signal processor 341; and S1224, controlling the signal processor 341 to drive the second motor 380 according to the second stretching-out instruction so as to drive the second stretchable rod 370 to stretch out in the second stretching-out length.

In the S1224, the second stretching-out length $L_{s2}$ can be determined according to the following equation.

$$L_{s2} \leq D - L_{35} - L_{32} - L_{37} L_{s1}$$

The central control device 50 can further send a second termination instruction to the signal processor 341 to terminate the stretching out of the second stretchable rod 370 once the second stretchable rod 370 is stretched out for the second stretching-out length.

The first and second stretching out lengths $L_{s1}$, $L_{s2}$ of the first stretchable rod 350 and the second stretchable rod 370 can be controlled by controlling stretching out speeds and stretching times of the first stretchable rod 350 and the second stretchable rod 370.

In an embodiment, after the S140, the method can further include:

S150, controlling the first stretchable rod 350 and the second stretchable rod 370 to draw back.

After the data process, the central control device 50 can send a drawing-back instruction to the signal processor 341 to control the first stretchable rod 350 and the second stretchable rod 370 to draw back.

After the detection to the targeted water area, the detection apparatus 10 can be moved to the next targeted water area to carry out the next detection.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A magnetism detection apparatus for detecting an underwater unexploded ordnance, comprising:
    a detection device comprising an array of detection assemblies arranged in a same plane, the array of detection assemblies being configured to detect magnetic fields and output magnetic field signals corresponding to locations of the detection assemblies;
    at least one first locating device disposed on one of the detection assemblies to locate this detection assembly and output a first coordinate signal corresponding to this detection assembly; and
    a central control device communicatively and respectively connected to each of the detection assemblies and the at least one first locating device, and configured to store information of relative locations of the detection assemblies, receive the magnetic field signals and the first coordinate signal, and obtain a respective location of the relative locations of a detection assembly of the detection assemblies sending a maximum magnetic field signal based on the first coordinate signal and the information of the relative locations of the detection assemblies;
    wherein each of the detection assemblies comprises:
    a head member, a first hollow space being defined in the head member;
    a magnetic field detector having a housing; and
    a plummet configured to keep the detection assembly aligned vertically in the water;
    wherein the head member, the housing, and the plummet are connected in sequence and have a common central axis;
    wherein the each of the detection assemblies further comprises a control device communicatively connected to the central control device and disposed in the first hollow space;
    the magnetic field detector comprises a first magnetometer and a second magnetometer disposed in the housing, located at different locations along the common central axis, and communicatively and respectively connected to the control device;
    the first magnetometer is capable of sending a first magnetic field signal to the control device, the second magnetometer is capable of sending a second magnetic field signal to the control device; and
    the control device is configured to receive the first magnetic field signal and the second magnetic field signal and send a magnetic field gradient signal to the central control device according to the first magnetic field signal and the second magnetic signal.

2. The magnetism detection apparatus of claim 1, wherein the array of detection assemblies are arranged in rows and columns, the rows and the columns are intersected with each other, any two adjacent detection assemblies of the detection assemblies in any same row are fixedly connected to each other, and any two adjacent detection assemblies of the detection assemblies in any same column are fixedly connected to each other.

3. The magnetism detection apparatus of claim 2, wherein the detection device further comprises a plurality of fixing rods having a same length, the any two adjacent detection assemblies are fixedly connected to each other and spaced from each other through one of the plurality of fixing rods.

4. The magnetism detection apparatus of claim 1, further comprising:
    a first fixing member rigidly connected to the detection device and fix a location of the detection device;
    wherein the central control device is mounted on the first fixing member.

5. The magnetism detection apparatus of claim 4, further comprising:
    a second fixing member rigidly connected to the detection device and fix the detection device in combination with the first fixing member;
    wherein the first fixing member and second fixing member are disposed at two opposite sides of the detection device.

6. The magnetism detection apparatus of claim 5, further comprising a first connecting rod and a second connecting rod, wherein the first fixing member is rigidly connected to the detection device through the first connecting rod, and the second fixing member is rigidly connected to the detection device through the second connecting rod.

7. The magnetism detection apparatus of claim 6, wherein the first connecting rod and the second connecting rod are length-adjustable.

8. The magnetism detection apparatus of claim 4, further comprising:
    a second locating device disposed on the first fixing member and communicatively connected to the first locating device;
    wherein the second locating device is capable of sending a second coordinate signal to the first locating device; and
    the first locating device is capable of receiving the second coordinate signal, correcting the first coordinate signal according to the second coordinate signal to generate a corrected first coordinate signal, and sending the corrected first coordinate signal to the central control device.

9. The magnetism detection apparatus of claim 1, wherein the head member defines threaded holes respectively at a bottom surface, a front surface, a rear surface, a left surface, and a right surface thereof, and further comprising a plurality of fixing rods that each have two opposite threaded ends capable of being screwed into the threaded holes.

10. The magnetism detection apparatus of claim 1, wherein the control device comprises:
- a signal processor electrically and respectively connected to the first magnetometer and the second magnetometer, and configured to receive the first magnetic field signal and the second magnetic field signal, and generate the magnetic field gradient signal; and
- a communication circuit communicatively and respectively connected to the signal processor and the central control device, and configured to receive the magnetic field gradient signal from the control device and send the magnetic field gradient signal to the central control device; and
- a power source electrically and respectively connected to the first magnetometer, the second magnetometer, the signal processor, and the communication circuit.

11. The magnetism detection apparatus of claim 1, wherein the each of the detection assemblies further comprises:
- a first stretchable rod, one end of the first stretchable rod being connected to the head member, the other end of the first stretchable rod being connected to the housing, and a second hollow space being defined in the end of the first stretchable rod connected to the head member; and
- a first motor disposed in the second hollow space, mechanically connected to the first stretchable rod to stretch out or draw back the first stretchable rod, and electrically connected to the control device.

12. The magnetism detection apparatus of claim 11, wherein each of the plurality of detection assemblies further comprises:
- a second stretchable rod, one end of the second stretchable rod being connected to the housing, the other end of the second stretchable rod being connected to the plummet, and a third hollow space being defined in the end of the second stretchable rod connected to the housing; and
- a second motor disposed in the third hollow space, mechanically connected to the second stretchable rod to stretch out or draw back the second stretchable rod, and electrically connected to the control device.

13. The magnetism detection apparatus of claim 12, further comprising a depth detector communicatively connected to the central control device;
- wherein the depth detector is configured to detect a water depth and output a water depth signal to the central control device;
- the central control device is further configured to receive the water depth signal and send a first stretching-out instruction indicating a first stretching-out length of the first stretchable rod and a second stretching-out instruction indicating a second stretching-out length of the second stretchable rod to the control device according to the water depth signal; and
- the control device is configured to drive the first motor according to the first stretching-out instruction and drive the second motor according to the second stretching-out instruction.

14. A method for controlling the magnetism detection apparatus of claim 1, comprising:
- controlling the detection assemblies to detect the magnetic fields and output the magnetic field signals corresponding to the locations of the detection assemblies;
- controlling the first locating device to locate the one of the detection assemblies and output the first coordinate signal;
- controlling the central control device to receive the magnetic field signals and the first coordinate signal, and obtain the location of the detection assembly sending the maximum magnetic field signal based on the first coordinate signal and the information of the relative locations of the detection assemblies.

15. The method of claim 14, wherein the magnetism detection apparatus further comprises a second locating device communicatively connected to the first locating device;
the method further comprises:
- controlling the second locating device to send a second coordinate signal corresponding a location of the second locating device to the first locating device; and
- controlling the first locating device to receive the second coordinate signal and correct the first coordinate signal according to the second coordinate signal to generate a corrected first coordinate signal.

16. The method of claim 14, wherein the magnetism detection apparatus further comprises a depth detector communicatively connected to the central control device, and each of the detection assemblies comprises:
- a head member, a first hollow space being defined in the head member;
- a magnetic field detector having a housing;
- a first stretchable rod, one end of the first stretchable rod being connected to the head member, the other end of the first stretchable rod being connected to the housing, and a second hollow space being defined in the end of the first stretchable rod connected to the head member;
- a plummet connected to the housing and configured to keep the detection assembly aligned vertically in water; and
- a first motor disposed in the second hollow space, mechanically connected to the first stretchable rod, and electrically connected to the control device;

before the controlling the detection assemblies to detect the magnetic fields and output the magnetic field signals corresponding to the locations of the detection assemblies, the method further comprises:
- controlling the depth detector to detect a water depth and output a water depth signal;
- controlling the central control device to receive the water depth signal and send a first stretching-out instruction indicating a first stretching-out length of the first stretchable rod according to the water depth to the control device; and
- controlling the control device to drive the first motor according to the first stretching-out instruction so as to stretch out the first stretchable rod.

17. The method of claim 16, wherein each of the plurality of detection assemblies further comprises:
- a second stretchable rod, one end of the second stretchable rod being connected to the housing, the other end of the second stretchable rod being connected to the plummet, and a third hollow space being defined in the end of the second stretchable rod connected to the housing; and
- a second motor disposed in the third hollow space, mechanically connected to the second stretchable rod, and electrically connected to the control device;

the method further comprises:
- controlling the central control device to send a second stretching-out instruction indicating a second stretching-out length of the second stretchable rod according to the first stretching-out length and the water depth to the control device; and controlling the control device to drive the second motor according to the second stretching-out instruction so as to stretch out the second stretchable rod.

18. The method of claim 17, further comprising:

controlling the central control device to send a drawing-back instruction to the control device; and controlling the control device to drive the first motor and the second motor according to the drawing-back instruction so as to draw back the first stretchable rod and the second stretchable rod after the controlling the central control device to obtain the location of the detection assembly sending the maximum magnetic field signal.

\* \* \* \* \*